United States Patent [19]
Nelson

[11] 3,848,962
[45] Nov. 19, 1974

[54] SLIDE MOUNTING APPARATUS FOR MICROSCOPY

[75] Inventor: John Russell Nelson, Natick, Mass.

[73] Assignee: Coulter Electronics, Inc., Hialeah, Fla.

[22] Filed: Oct. 18, 1973

[21] Appl. No.: 407,537

[52] U.S. Cl.................................. 350/86, 350/90
[51] Int. Cl. ........................................ G02b 21/00
[58] Field of Search................................ 350/86, 90

[56] References Cited
UNITED STATES PATENTS
| | | | |
|---|---|---|---|
| 3,520,055 | 7/1970 | Jannett | 350/90 |
| 3,549,232 | 12/1970 | Hugle | 350/90 |
| 3,778,131 | 12/1973 | Wanesky | 350/90 |

Primary Examiner—James W. Lawrence
Assistant Examiner—C. E. Church
Attorney, Agent, or Firm—Silverman & Cass

[57] ABSTRACT

Slide mounting apparatus for microscopy includes vacuum chuck means having at least one slide-registration surface to which a vacuum may be applied and mountable with the surface facing in the direction of a microscopy stage, the registration surface being adapted for securing the specimen-bearing surface of a prepared slide thereagainst by vacuum for registering the specimen area of the slide with the focal plane of a microscope objective lens in a predetermined position, a vacuum reservoir connected to the chuck, and a vacuum pump connected to the reservoir, whereby the chuck can be evacuated repeatedly by the reservoir for securing a series of slides against the registration surface successively for microscopic examination between pumpings to evacuate the reservoir.

13 Claims, 3 Drawing Figures

PATENTED NOV 19 1974        3,848,962

SLIDE MOUNTING APPARATUS FOR MICROSCOPY

BACKGROUND OF THE INVENTION

This invention relates to slide mounting apparatus for microscopy, more particularly, to vacuum apparatus adapted for mounting a slide on a microscopy stage for examination.

The provision of computerized automatic or semi-automatic equipment for microscopy necessitates the provision of means for mounting slides for examination or analysis rapidly, accurately, securely, and without injury to the slides, in apparatus designed for limited movement of its parts to thereby minimize wear and vibration, and to attain the high degree of accuracy required in microscopic analysis. Vacuum or suction mounting means and method are potentially attractive for accomplishing the foregoing objectives. U.S. Pat. No. 3,549,232 discloses a microscope alignment mechanism in which a workpiece is held to the upper surface of a chuck plate by vacuum means. However, the disclosed mounting makes no provision for variations in thicknesses of workpieces or for irregularities in the mounting surfaces thereof, so that the working area or area being viewed through the microscope is at a distance from the objective lens which varies from workpiece to workpiece and therefore requires compensating adjustment of the mounting means or the lens.

Another consideration in the use of vacuum-operated slide mounting means is the vibration which may be imparted to the apparatus by the operation of a vacuum pump. It is necessary for accurate analysis that no vibration be imparted in connection with the provision of the necessary vacuum.

SUMMARY OF THE INVENTION

The invention provides slide mounting apparatus for microscopy which includes a vacuum-operated slide holder adapted for mounting on a microscopy stage or the like, and vacuum apparatus adapted for operating the slide holder. The slide holder and the vacuum apparatus are useful independently of each other, and each represents an improvement in microscopy apparatus. In the preferred embodiment of the invention, they are employed in combination.

The slide holder is adapted for mounting on a microscopy stage and includes vacuum chuck means having at least one slide-registration or mounting surface to which a vacuum is applied by evacuation of the chuck means for securing a slide thereagainst, means for mounting the chuck means on a microscopy stage with the slide-registration surface facing in the direction of the stage, the chuck means and the mounting means being adapted for disposing the specimen-bearing surface of a prepared slide against the registration surface with the specimen area exposed for examination, whereby when a microscope objective lens is in a predetermined position relative to the registration surface, the specimen area is in registry with the focal plane of the objective lens, and means for connecting the chuck means to a vacuum source for evacuating the chuck means.

The slide holder overcomes the problems posed by the prior art by operation with slides of varying thickness and regularity, in that the specimen-bearing surface of the slide is mounted against the registration surface of the chuck means, so that the specimen-bearing surface always is in the same plane with respect to the chuck means. Consequently, the amount of focusing adjustment which must be provided is minimized, thereby minimizing movement, vibration and wear of the apparatus, to preserve maximum accuracy and reliability.

The vacuum apparatus is adapted for operating the vacuum chuck means of a microscope slide holder and includes a vacuum reservoir having a capacity equivalent to a multiple of the capacity of the vacuum chuck means, means for connecting the chuck means to the reservoir for evacuating the chuck means, and a vacuum pump connected to the reservoir for evacuating the reservoir, whereby connected chuck means can be evacuated repeatedly by the reservoir for securing a series of slides to the chuck means successively for examination between pumpings. In its preferred embodiment, the vacuum apparatus includes vent means and valve means associated with the connecting means for venting connected chuck means and closing off connection to the reservoir while the chuck means is being vented.

The vacuum apparatus provides for examination of a plurality of microscope slides sequentially over a period of time, without vibration such as would result from operation of the vacuum pump. The pump can be operated only relatively infrequently, after any desirable number of operations as determined by the capacity of the reservoir relative to that of the chuck means. The provision of the reservoir also avoids vacuum surges which may be encountered during pump operation.

DESCRIPTION OF THE PREFERRED EMBODIMENT

Figure 1:
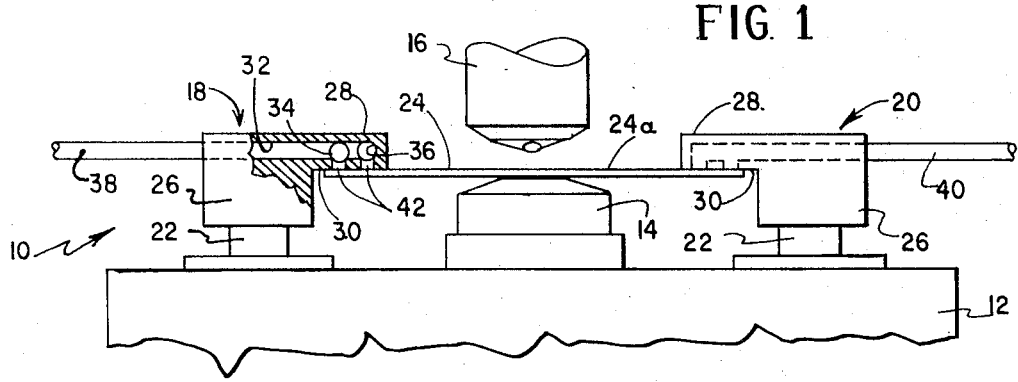
FIG. 1 is a schematic side elevational view of a slide holder according to a preferred embodiment of the invention, with a portion broken away and in section, illustrating the holder as it can be employed in microscopy apparatus, elements of which are shown fragmentarily.

Referring to FIG. 1, a slide holder 10 is mounted on the stage 12 of a microscope. Other components of the microscope shown in conjunction with the slide holder are a condenser lens 14 projecting upwardly from the stage 12, and an objective lens 16 mounted above the condenser and facing in the direction of the stage 12.

The slide holder 10 includes a pair of vacuum chucks 18 and 20 disposed in spaced opposed relation. Each of the chucks is mounted on a chuck support 22, which in turn is mounted on the stage 12. The chucks are arranged to receive and support a microscope slide 24 over the condenser 14 and beneath the objective 16, closely adjacent to the respective members.

Each of the chucks 18 and 20 includes a body 26 mounted on the support 22, and a slide-mounting arm 28 integral with the body and extending inwardly therefrom at the upper end thereof. Each arm 28 is provided with a generally flat slide-registration surface 30. The slide-registration surfaces 30 are on the back sides of the arms 28 and face in the direction of the stage 12. The registration surfaces 30 are accessible for the insertion of a slide 24 in any desirable manner, between the chuck bodies 26 and over the condenser 14.

Figure 2:
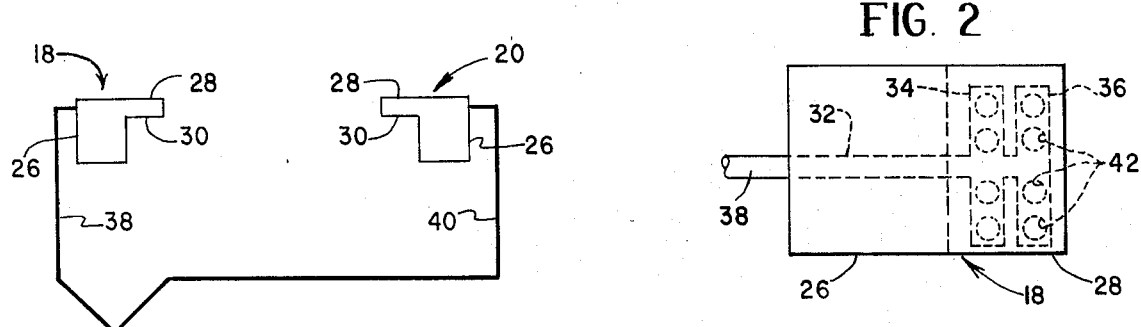
FIG. 2 is an enlarged top plan view of a vacuum chuck employed in the slide holder of FIG. 1.

Referring to FIG. 2, in which one chuck 18 is shown as illustrative of both chucks 18 and 20, each of the chucks is provided with an internal cavity which, in illustrative embodiment, is made up of three passages or borings 32, 34 and 36. One passage 32 extends longitudinally and centrally of the upper or outer end of the body 26 and longitudinally into the arm 28 of each chuck. The two spaced passages 34 and 36 are parallel and extend transversely within the arm 28 and intersect the longitudinal passage 32. The longitudinal passage 32 extends to the outer side of the body 26, for connecting the chuck to a vacuum source. As seen in FIG. 1, branch vacuum conduits 38 and 40 are connected to the chucks 18 and 20, respectively, in communication with the outer ends of the respective longitudinal passages 32.

Apertures 42 are provided in each of the slide-registration surfaces 30 and are arranged in two spaced, parallel, transverse rows which intersect the transverse passages 34 and 36 and thus communicate with the internal cavity composed of the passages 32, 34 and 36. Upon evacuation of the chuck cavity, a vacuum is applied to the slide registration surface 30 by way of the apertures 42 to secure a slide 24 against the registration surface, for examination of the slide.

The slide-registration surfaces 30 of the chucks 18 and 20 and the focal plane of the objective 16 are coincident or substantially so. Consequently, the outer or upper surface 24a of the slide 24, i.e., its specimen-bearing surface, is coincident with the focal plane. The specimen area of the slide, disposed on the surface 24a in the space between the inner ends of the slide-mounting arms 28, is exposed to the objective 16 for examination, and it is in registry with the focal plane. For this reason, variations in slide thickness and regularity do not affect the focus in sequencing from slide to slide.

The slide holder 10 is well adapted for rapid and accurate automatic processing of a series of slides. The vacuum mounting means provides for application of substantial supporting force without high pressure areas on the slides, thereby minimizing the possibility of slide damage. Also, there is no scratching or abrasion, such as might result from the use of mechanical mounting means.

Figure 3:
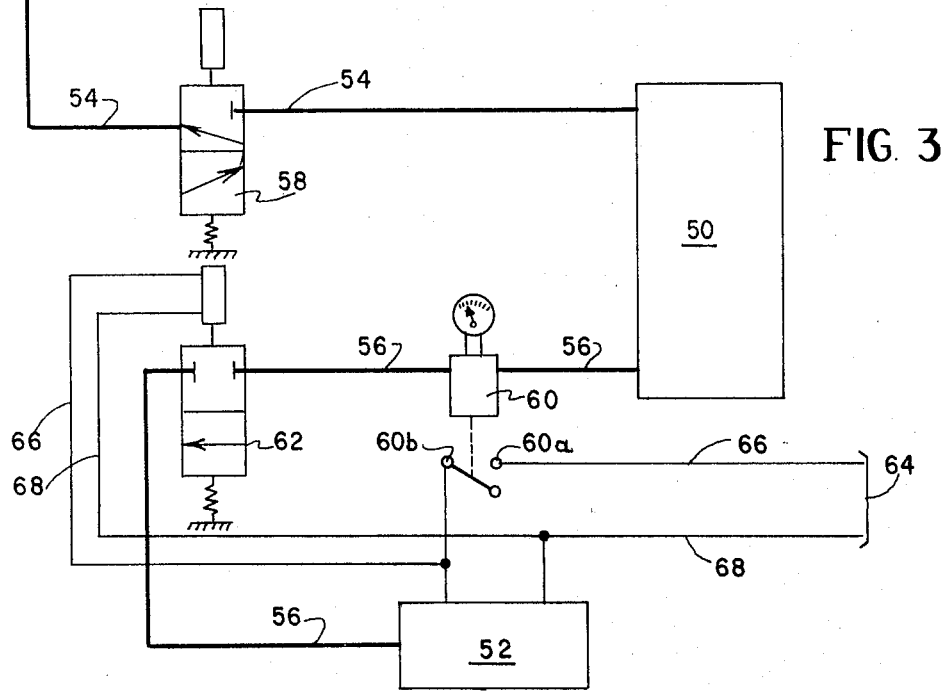
FIG. 3 is a diagrammatic view of a preferred embodiment of the vacuum apparatus of the invention.

Referring to FIG. 3, the vacuum apparatus includes a vacuum reservoir 50 connected to the chucks 18 and 20, and a vacuum pump 52 connected to the reservoir 50. The reservoir 50 is connected to the chucks 18 and 20 for evacuation of the chucks by the reservoir, by means of a main vacuum conduit 54 connected to the reservoir, and the branch conduits 38 and 40 connected to the main conduit 54 at one end of each and to the respective chucks 18 and 20 at the opposite ends. The vacuum pump 52 is connected to the reservoir 50 for evacuating the reservoir, by means of a vacuum supply conduit 56.

An operating valve 58 is interposed in the vacuum path between the chucks 18 and 20 and the reservoir 50, and is mounted in the main vacuum conduit 54. The valve 58 can be a two-position solenoid valve which normally is closed when deenergized (as illustrated), to close the section of the conduit 54 leading from the reservoir 50, while at the same time venting the remainder of the main conduit 54, the branch conduits 38 and 40, and the chucks 18 and 20. The operating valve 58 is energized for operating it to open the main conduit 54 from the reservoir 50 and stop venting the system, in response to the proper positioning of a slide 24 in relation to the chucks 18 and 20, by means not illustrated. The chucks 18 and 20 thereupon are evacuated by the reservoir 50.

Upon evacuation of the chucks 18 and 20, vacuum or suction is applied to a slide 24 disposed adjacent to the slide-registration surfaces 30, as illustrated in FIG. 1, thereby securing the slide firmly against the pull of gravity and against the registration surfaces for examination. The application of vacuum is continued in this manner until examination of the slide is complete. The operating valve 58 then is deenergized for operating it to close the section of the main conduit 54 leading to the reservoir 50, thereby preventing loss of vacuum from the reservoir, and to vent the section of the main conduit 54 and the branch conduits 38 and 40 leading to the chucks 18 and 20, thereby also venting the chucks and breaking the vacuum serving to support the slide 24. The slide thereupon is released from the registration surfaces 30 and can be removed and replaced by another slide. The process is repeated for examining each successive slide.

The capacity or gas space in the vacuum reservoir 50 is a multiple of the combined capacity of the chucks 18 and 20, including their supply lines 38, 40 and 54 in part. Consequently, the chucks 18 and 20 can be evacuated repeatedly by the reservoir 50, for securing a series of slides against the slide registration surfaces 30 successively for examination, without re-evacuating the reservoir 50. An important advantage of this apparatus is that, while a sequence of slides are being examined, no vibration is imparted to the microscopy apparatus or any apparatus used in conjunction therewith, so that extremely fine readings may be obtained with the necessary high degree of accuracy. The reservoir 50 also functions as a buffer, to provide uniform vacuum pickup from slide to slide, by the slide-mounting arms 28.

The vacuum pump 52 is operated intermittently, in response to a predetermined increase in pressure, or corresponding decrease in vacuum, in the reservoir 50. For this purpose, a vacuum-responsive electrical switch 60 and a supply valve 62 are mounted in the supply conduit 56 between the vacuum pump 52 and the reservoir 50. The supply valve 62 can be a two-position solenoid valve which normally is closed when deenergized (as illustrated), to close the supply conduit 56 to flow between the pump 52 and the reservoir 50.

A power source 64 supplies power to the pump 52 and to the supply valve 62 through conductors 66 and 68. One conductor 66 is connected through the contacts 60a and 60b of the switch 60. When the switch 60 closes at a predetermined level of pressure in the reservoir 50, thereby bridging the contacts 60a and 60b, the pump 52 and the supply valve 62 are energized, to start the pump and open the valve, for evacuating the reservoir 50 through the supply conduit 56. When a predetermined decrease in pressure, or corresponding increase in vacuum, is reached in the reservoir 50, the switch 60 opens and thereby deenergizes the pump 52 and the supply valve 62, to stop the pump and close the valve. The supply valve 62 is closed to prevent loss of vacuum from the reservoir 50, through the pump 52.

While a preferred embodiment of the invention has been illustrated and described, it will be apparent that various changes and modifications can be made therein within the spirit and scope of the invention. It is intended that such changes and modifications be included within the scope of the appended claims.

What is claimed is:

1. Slide mounting apparatus for microscopy which comprises:
   vacuum chuck means having at least one slide-registration surface to which a vacuum can be applied by evacuation of the chuck means for securing a specimen-bearing slide thereagainst,
   a vacuum reservoir having a capacity equivalent to a multiple of the capacity of said chuck means,
   vacuum path defining means connecting the reservoir to the chuck means, for transmitting vacuum thereto, and
   a vacuum pump connected to said reservoir for periodically evacuating the reservoir,
   whereby the chuck means can be evacuated repeatedly by means of the reservoir for successively securing a series of slides against said slide registration surface for examination between evacuations of said reservoir by said pump.

2. Apparatus according to claim 1 further including vent means and first valve means connected to said vacuum path defining means for venting said chuck means and closing off connection to the reservoir while the chuck means is being vented.

3. Apparatus according to claim 1 further including second valve means interposed between said reservoir and said pump, and means responsive to the pressure in said reservoir for starting said pump and opening said second valve means together, and for stopping said pump and closing said second valve means together.

4. Apparatus according to claim 1 further including means for mounting said chuck means relative to a microscopy stage with said slide-registration surface facing in the direction of the stage, said chuck means and mounting means being adapted for disposing the specimen-bearing surface of a slide against said slide-registration surface with the specimen area exposed for examination and facing away from the stage.

5. Apparatus according to claim 4 in which said chuck means and mounting means are constructed and oriented for holding the slide to the slide-registration surface against the force of gravity.

6. Apparatus according to claim 4 in which said chuck means comprises a pair of chucks disposed in spaced opposed relation, each of said chucks having a slide-registration surface for receiving one end of a slide thereagainst.

7. Apparatus according to claim 4 wherein said chuck means has an internal cavity constructed for connection to said vacuum path defining means, and aperture means are provided opening into said slide-registration surface and in communication with said cavity, for transmitting vacuum from said reservoir to said slide-registration surface.

8. Apparatus according to claim 4 wherein said chuck means and said mounting means are adapted for disposing the specimen-bearing surface of a slide adjacent an objective lens, and the opposite surface of the slide adjacent a condenser lens.

9. Apparatus according to claim 8 wherein said chuck means and said mounting means are constructed and oriented such that the slide-registration surface is in registry with the focal plane of the objective lens.

10. Slide mounting apparatus for microscopy which comprises:
    vacuum chuck means having at least one slide-registration surface to which a vacuum can be applied by evacuation of the chuck means for securing a specimen-bearing slide thereagainst,
    means for mounting said chuck means relative to a microscopy stage with said slide-registration surface facing in the direction of the stage,
    said chuck means and mounting means being adapted for disposing the specimen-bearing surface of a slide against said slide-registration surface with the specimen area exposed for examination by a microscope objective lens facing in the direction of said stage, such that said slide-registration surface and said specimen-bearing surface are in registry simultaneously with the focal plane of the objective lens, and
    means for connecting said chuck means to a vacuum source for evacuating said chuck means.

11. Apparatus according to claim 10 in which said chuck means and mounting means are constructed and oriented for holding the slide to the slide-registration surface against the force of gravity.

12. Apparatus according to claim 10 in which said chuck means comprises a pair of chucks disposed in spaced opposed relation, each of said chucks having a slide-registration surface for receiving one end of a slide thereagainst.

13. Apparatus according to claim 10 wherein said chuck means has an internal cavity constructed for connection to said vacuum source connecting means, and aperture means are provided opening into said slide-registration surface and in communication with said cavity, for transmitting vacuum from said source to said slide-registration surface.

* * * * *